United States Patent [19]

Wanner et al.

[11] Patent Number: 5,720,069
[45] Date of Patent: Feb. 24, 1998

[54] ARRANGEMENT FOR SURFACE TREATMENT, ESPECIALLY THE CLEANING OF THE SURFACES OF LARGE OBJECTS

[75] Inventors: Martin Wanner, Stuttgart; Karl Schlecht, Filderstadt; Dietmar Fuegel, Wolfschlugen; Stefan Fritz, Stuttgart, all of Germany

[73] Assignee: Putzmeister-Werk Maschinenfabrik GmbH, Aichtal, Germany

[21] Appl. No.: 602,763
[22] PCT Filed: Aug. 6, 1994
[86] PCT No.: PCT/EP94/02611
§ 371 Date: Feb. 23, 1996
§ 102(e) Date: Feb. 23, 1996
[87] PCT Pub. No.: WO95/06587
PCT Pub. Date: Mar. 9, 1995

[30] Foreign Application Priority Data

Aug. 31, 1993 [DE] Germany .......................... 43 29 254.2

[51] Int. Cl.$^6$ .......................... B60S 3/00; B60S 3/06
[52] U.S. Cl. .......................... 15/53.1; 15/53.2; 15/97.3; 15/DIG. 2
[58] Field of Search .......................... 15/50.3, 52.1, 15/53.1, 53.2, 53.3, 88.2, 88.3, 88.4, DIG. 2, 97.3

[56] References Cited

U.S. PATENT DOCUMENTS

| | | | |
|---|---|---|---|
| 3,775,798 | 12/1973 | Thornton-Trump | 15/53.2 |
| 5,092,012 | 3/1992 | Rabourn et al. | 15/53.2 |
| 5,592,710 | 1/1997 | Wanner et al. | 15/88.4 |

FOREIGN PATENT DOCUMENTS

| | | | |
|---|---|---|---|
| 0 262 097 | 3/1988 | European Pat. Off. . | |
| 0 165 911 | 12/1990 | European Pat. Off. . | |
| 4 04 684 | 12/1990 | European Pat. Off. . | |
| 2703376 | 10/1994 | France | 15/88.4 |
| 75 14 387 | 9/1976 | Germany . | |
| 39 09762A1 | 9/1990 | Germany . | |
| 4035519A1 | 5/1991 | Germany . | |
| 4428734 | 2/1995 | Germany | 15/53.2 |
| 1-178605 | 7/1989 | Japan | 15/88.4 |
| 40 6-24298 | 2/1994 | Japan | 15/53.2 |
| 5 47 721 | 4/1974 | Switzerland . | |
| 6 03 383 | 8/1978 | Switzerland . | |
| 5 20 292 | 8/1976 | U.S.S.R. . | |
| 7 89 323 | 12/1980 | U.S.S.R. . | |
| WO 93/00261 | 1/1993 | WIPO . | |

OTHER PUBLICATIONS

Drews,Paul;u.a.: Systemkomponenten mobiler Roboter. In: VDI-Z 135, 1993, Nr. 7, S.74–78.

Karl,G.; u.a.: Die Umwelt dreidimensional erfassen. In: Elektronik 19, 1989, S.78–88.

Primary Examiner—Terrence Till
Attorney, Agent, or Firm—Flynn, Thiel, Boutell & Tanis, P.C.

[57] ABSTRACT

The invention relates to an arrangement for cleaning the surfaces of aircraft with a large manipulator having a rotating brush head consisting of several extensions (12, 12', 12", 14) pivotable on articulations (20, 22, 24, 28) by means of hydraulic drive systems (30) and fitted on a rotary bracket (11) of a motor-driven chassis (10) with its base extension (12) fitted on an angled mast to rotate about a main axis (11) and a multiple articulation (16) on the end extension (14) at the free end. To provide starting auxiliary for the chassis (10), the adaptation of the large manipulator to the aircraft and/or monitoring facilities for the cleaning process, there is an opto-electronic distance camera (40) and a computer-supported electronic evaluation system to which the output signals of the distance camera (40) are applied.

16 Claims, 4 Drawing Sheets

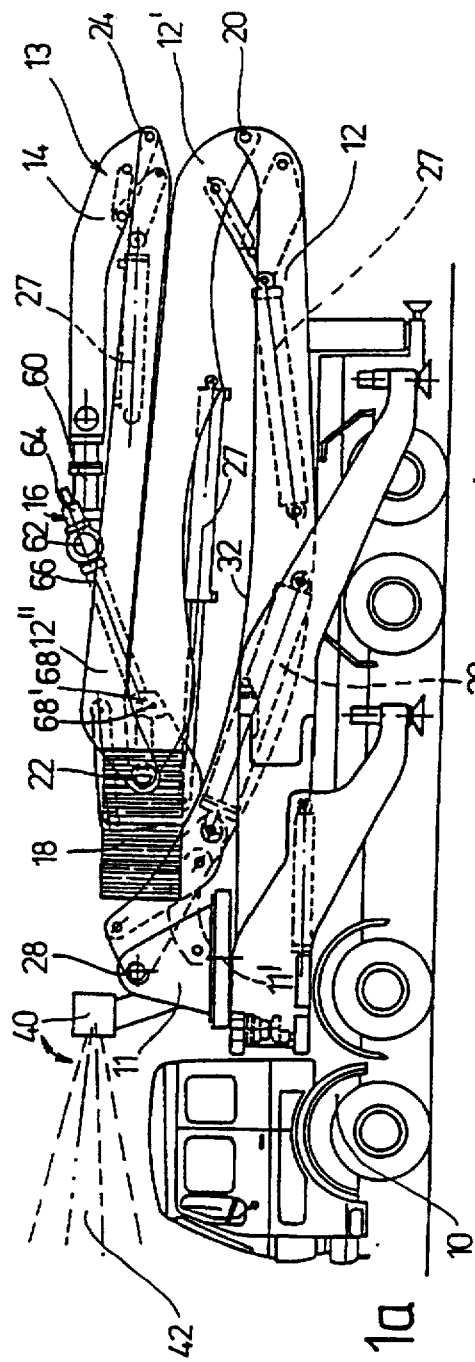
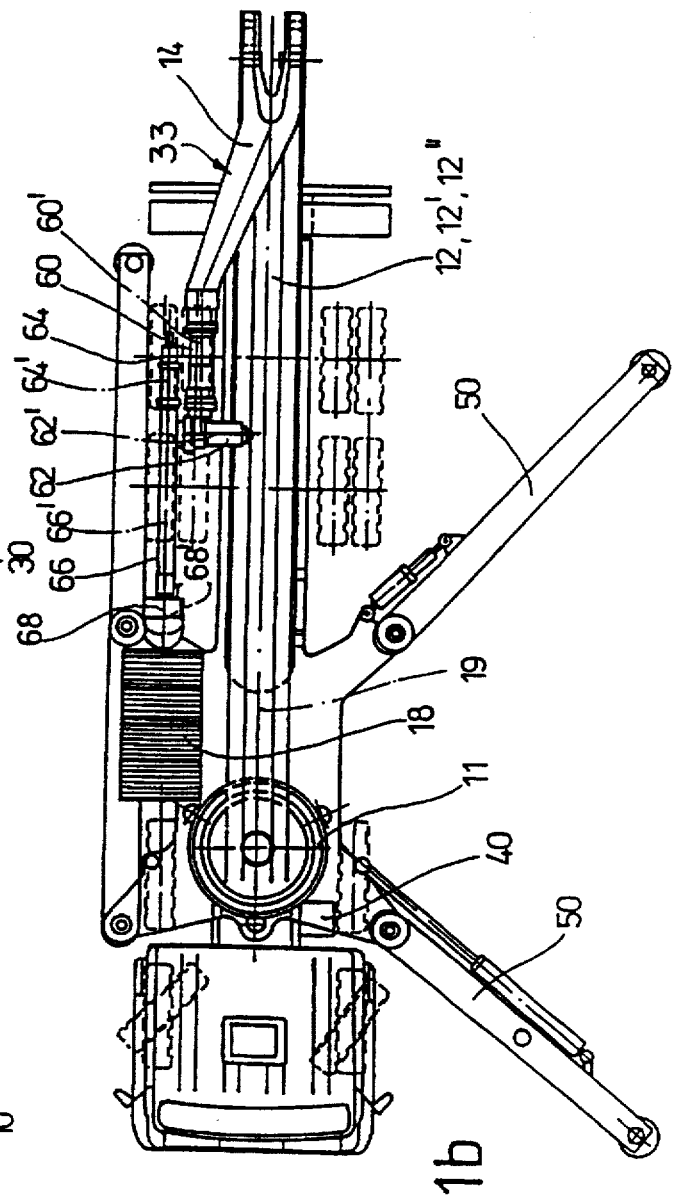
Fig. 1a
Fig. 1b

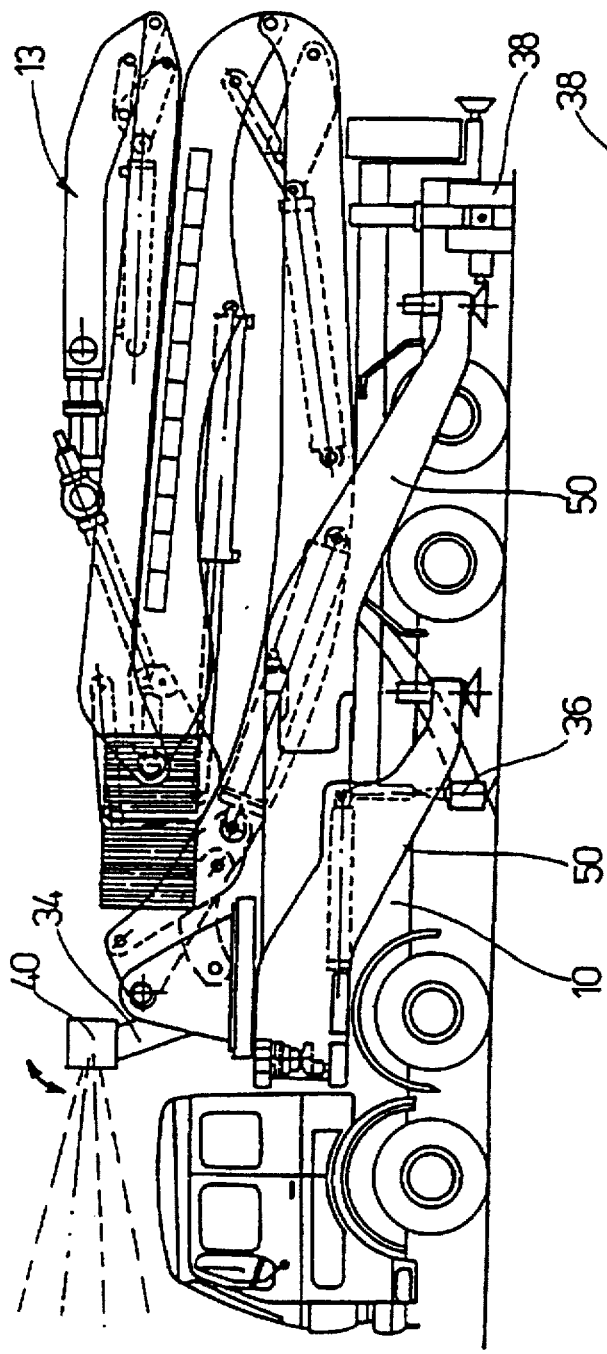
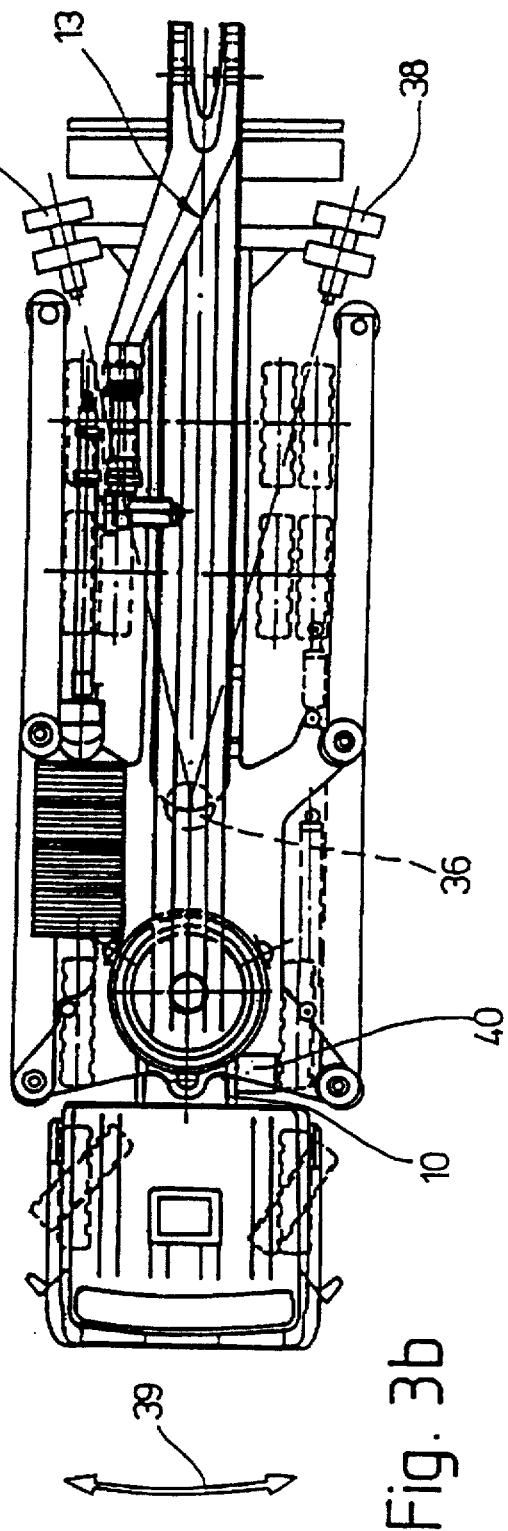

ARRANGEMENT FOR SURFACE TREATMENT, ESPECIALLY THE CLEANING OF THE SURFACES OF LARGE OBJECTS

The invention relates to an arrangement for the surface treatment, in particular for the surface cleaning of large objects, like aircrafts, ships or building, comprising a large manipulator, which has an articulated mast, which consists Of several arms pivotal with respect to one another on pivot joints by means of hydraulic or motor drive mechanisms, and which is rotatably supported with its base arm about a vertical axis on a pivot-bearing block of an apparatus carrier preferably designed as a motor-driven undercarriage, and has a tool, which is arranged on the last arm of the articulated mast or on the free end of a multiple joint arranged on the last arm, and is preferably designed as a rotating brush head.

DE-A-40 35 519 has already suggested to equip a large manipulator with a remote-controllable brush head. The known large manipulator has an articulated mast composed of several arms pivotal with respect to one another at their ends. The base arm of the articulated mast is supported rotatably about a vertical axis on a pivot-bearing block arranged on a motor-driven undercarriage, and the last arm of the articulated mast has a multiple joint, which can be provided with a brush head. It is also known from this reference to equip the brush head with sensors, which enable controllable guiding of the brush head relative to the surface to be treated according to a sensor signal, which occurs on the sensor during the cleaning operation and which can be read. The articulated mast has, in the known arrangement, a total of five arms collapsible against one another in a multiple-Z-fold, and which can be placed with the base arm lying on top and the last arm at the bottom with the multiple joint and brush head on the undercarriage for transporting purposes. In order to be able to work in the overhead operation, the articulated mast must first be lifted off from the undercarriage through the base joint of the pivot-bearing block and must be rotated at 180° about the pivot axis of the pivot-bearing block into the operating position. In particular, when working near the undercarriage and when working in halls, the limited pivoting range of the base joint of only 100° to 110° is hereby furthermore disadvantageous.

The basic purpose of the invention is to develop an arrangement of the above-identified type, with which even when the apparatus carrier, which carries the large manipulator, is inexactly positioned and oriented in front of the large object to be treated, a collision-free fully automatic treatment, even of surfaces with a complicated design, is possible.

The basic thought of the solution of the invention is that with an opto-electronic distance camera arranged on the large manipulator alignable with respect to the large object to be treated and with calculator-supported evaluating electronics receiving the distance image signals of the distance camera act as a start-up aid for the apparatus carrier, designed as an undercarriage, and/or a locating of the large manipulator relative to the large object to be treated, and/or a monitoring of the treatment operation is possible. The distance camera is arranged on a console supported on the side of the pivot-bearing block opposite the articulated mast, in the collapsed state, supported on the apparatus carrier, and is rotatable about its vertical axis together with the articulated mast and is also rotatable about its horizontal axis. In order to be able to utilize the distance camera not only in the collapsed state of the articulated mast, but also in its operating position for measurement and monitoring tasks, it is suggested according to a preferred development of the invention, that the base arm be supported pivotally with a pivot angle of approximately 180° about a horizontal axis on the pivot-bearing block, and that in the collapsed state of the articulated mast, the base arm be supported on the undercarriage under the other arms and the last arm is arranged above the other arms with the multiple joint pointing in the direction of the pivot-bearing block and the tool. With this structure, it is achieved that the articulated mast does not need to be rotated about the vertical axis of the pivot-bearing block when it changes from the collapsed resting position into the operating position, so that the distance camera connected to the pivot-bearing block is aligned in the direction of the large object both during the start-up phase, locating operation, and also during the subsequent treatment operation. Possible corrections and guiding can be carried out through the axes of movement of the distance camera and/or of the console.

In order to achieve a minimal arrangement height in the collapsed state of the manipulator, it is suggested according to an advantageous development of the invention, that the base arm have a concave curvature, which opens upwardly in its state remote from the undercarriage, for receiving the second arm hinged to the base arm in its collapsed state. A further improvement in this respect is achieved when the curvature of the base arm is designed such that, with the articulated mast collapsed the pivot joints provided at both ends of the second arm lie lower than the pivot joint of the base arm on the pivot-bearing block. Both the base arm and also the second arm can, in this case, be designed bend-free with a minimal arrangement height. Thus there is no torsional stress in the joints due to the weight of the arms, which would cause vibrations under a dynamic load, and which could not be easily damped by the cylinders arranged in the plane of the articulated arms.

In order to save space, it is possible to laterally bend the last arm with respect to the third arm, so that the tool with the articulated mast being collapsed can be supported near the pivot joint of the base arm on the pivot-bearing block. The bend is tolerable at this point because the torsion moments occurring there are small due to its own low weight. Furthermore, it is possible to design the last arm relatively short and box-shaped so that torsional vibrations can be substantially absorbed by a rigid construction.

It can be advantageous for reasons of symmetry, when besides the last arm, also the third arm is bent, namely, in such a manner that the bend of the fourth arm is being partially compensated for, so that the multiple joint moves in direction of the axis of symmetry of the articulated mast. A further compensation in this respect can be achieved by the multiple joint having three pivot points driven by a motor and having three axes arranged one behind the other and being alternately perpendicular to one another, and having a linear part connected to the last pivot point, aligned with its pivot axis, driven by a motor, and aligned in the collapsed state parallel with respect to the last arm. With this it is possible that the multiple joint is pivoted about its own axis in the direction of the axis of symmetry while compensating for the bend.

In order to be able to cover a sufficient pivoting range with the base arm, the base arm and its driving mechanism, which is designed as a hydraulic cylinder, are advantageously coupled through a Watt's link chain to the pivot-bearing block. The link chain has, for this purpose advantageously, a coupling plate hinged to the base arm and to the piston rod of the hydraulic cylinder above the pivot joint, and has a connecting rod hinged to the pivot-bearing block and to the coupling plate with its ends below the pivot joint, and is curved oppositely to the base arm. This structure results in a pivot angle of the base arm of 180° despite the spacially limited conditions in the area of the pivot-bearing block.

In order to be able to guarantee, during the overhead operation, an as large as possible range from the direct vicinity of the apparatus carrier to the complete extent of the articulated mast with the least possible energy input, accounting for the weight of the articulated mast, and with high mobility without a change in the configuration during the course of the movement operation, it is suggested according to the invention that the pivot angle between the base arm and the second arm is approximately 180° and between the second and third arm approximately 270°, whereas the pivot angle between the third arm and the last arm should be 180° to 270°.

In order to compensate for a course angle which cannot be travelled during the start-up phase, possibly because of obstacles, the undercarriage can be equipped with a combined lifting and pivoting mechanism having a center turning plate and two driving rollers, which can be aligned concentrically with respect to the turning plate and can be arranged at an angular distance from one another. The rollers can be together lowered onto the ground while lifting the undercarriage. The undercarriage when lifted off from the ground can then be aligned around the axis of the turning plate with the help of the driving rollers into the prescribed direction with respect to the large object.

This alignment can, however, basically be also carried out with software, by having the pivotally installed distance camera and/or the articulated mast guided about its vertical axis.

The invention will be discussed in greater detail hereinafter in connection with some exemplary embodiments schematically illustrated in the drawings, in which:

FIG. 1a and b are a side view and a top view of a large manipulator with washing brushes arranged on an undercarriage;

Figure 1C:
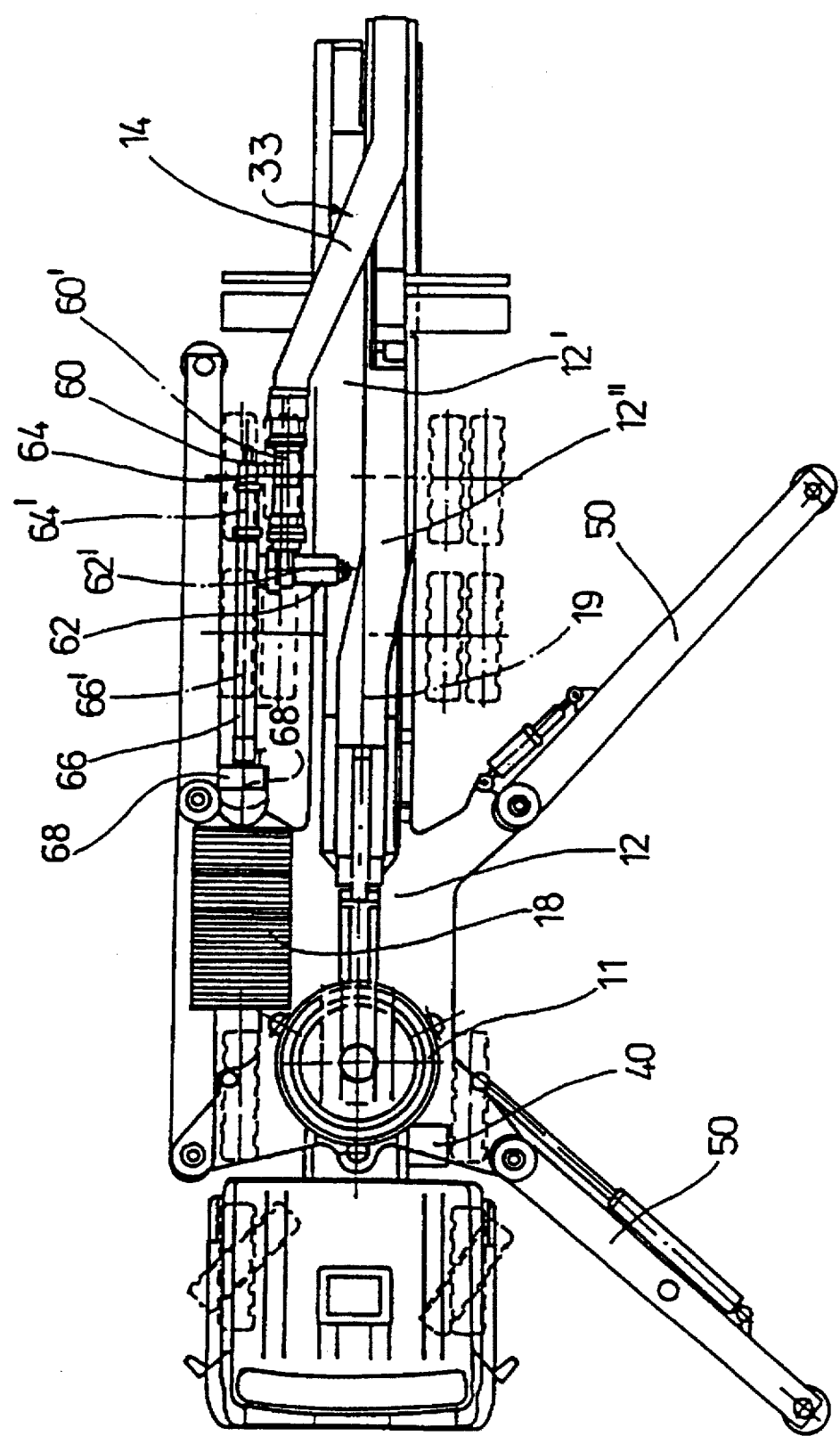
FIG. 1c is a top view corresponding with FIG. 1b of a modified exemplary embodiment of a large manipulator with a bent third arm.
Figure 2:
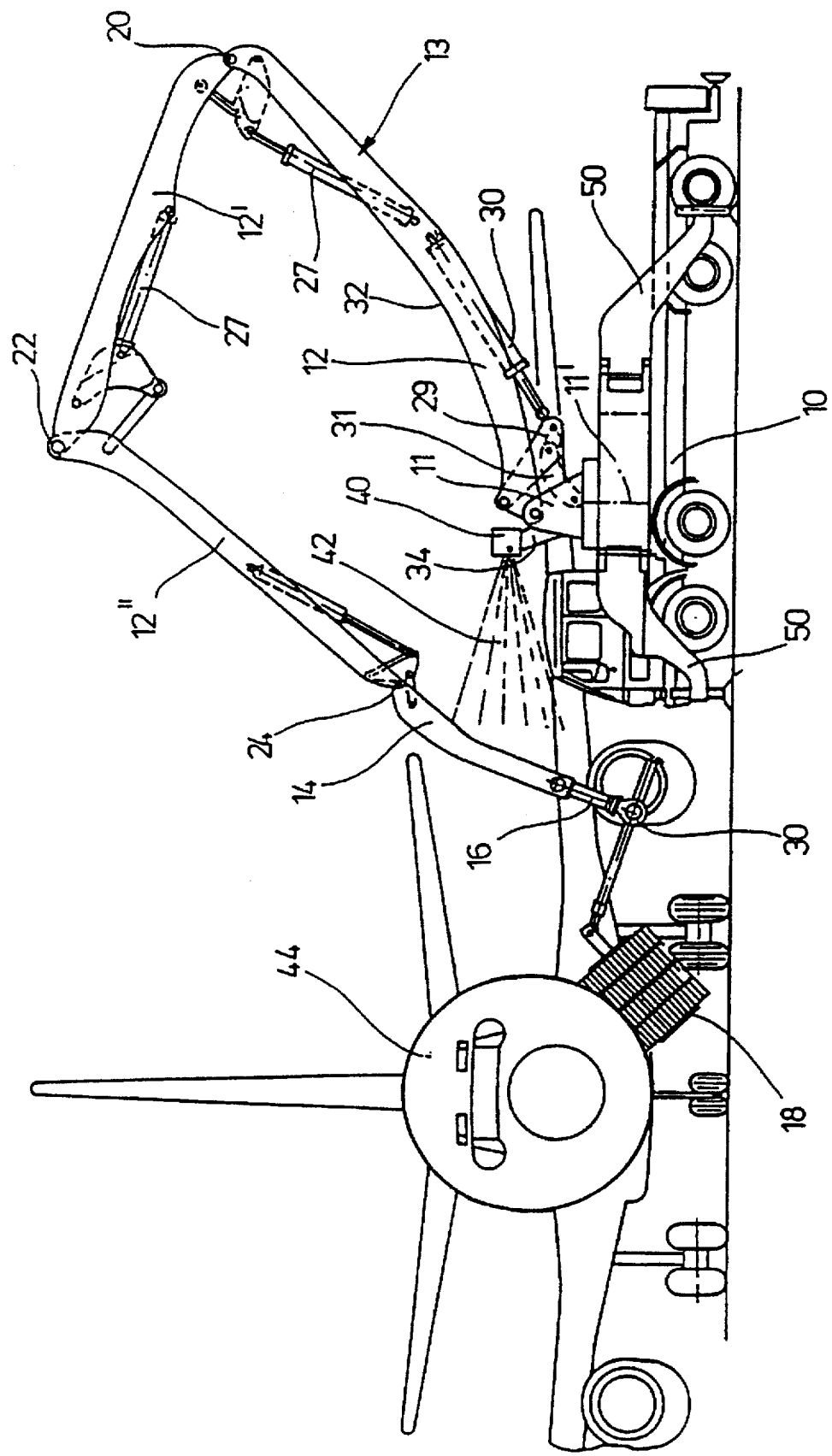
FIG. 2 is a side view of the large manipulator according to FIGS. 1a and b during the washing of an aircraft.

FIGS. 3a and b show an exemplary embodiment of a large manipulator with a lifting and pivoting mechanism, which manipulator is modified with respect to FIGS. 1a and b.

The mobile large manipulator illustrated in the drawings consists essentially of an articulated mast 13, which is rotatably supported with its base arm 12 about a vertical axis 11' on a pivot-bearing block 11 of a motor-driven undercarriage 10, a multiple joint 16 arranged on the last arm 14 of the articulated mast 13, and a brush head 18 releasably fastened at the free end of the multiple joint. The four arms 12, 12', 12" and 14 of the articulated mast 13 are connected with one another at their ends facing one another limited pivotally about horizontal axes at joints 20, 22, 24. The pivoting is done by means of hydraulic cylinders 27 arranged at suitable points between the arms. The base arm 12 is supported pivotally at 180° about a pivot-bearing block 11 on a horizontal bearing 28 by means of a hydraulic cylinder 30 and a Watt's link chain consisting of a coupling plate 29 and a banana-shaped curved connecting rod 31. The base arm 12 is positioned in the collapsed state under the other arms 12', 12", 14, whereas the last arm 14 with the multiple joint 16 pointing toward the pivot-bearing block 11 and the brush head 18 is positioned above the other arms 12, 12', 12". The base arm 12 is curved in its longitudinal extent such that in the collapsed state its upwardly pointing edge 32 forms a concave trough for receiving the collapsed second arm 12'. The base arm 12 and the second arm 12' are bent, whereas the last arm 14 has a lateral bend 33, which makes it possible to place the multiple joint 16 and the brush head 18 in the collapsed state next to the arms 12, 12', 12". The third arm 12" is not bent in FIG. 1b, whereas in the exemplary embodiment according to FIG. 1c, it is bent toward the side opposite the last arm 14. Because of the bend in the third arm, the bend of the fourth arm is partially being compensated for since the multiple joint 16 with the connected brush head 18 moves in direction of the axis of symmetry 19 of the articulated mast.

This arrangement makes it possible to cover with the brush head 18 any type of surface contours within the plane created by the arms 12, 12' 12", 14. In addition, it is possible with the help of the multiple joint 16 adjustable by a motor to move the brush head 18 around pivot and thrust axes relative to the last arm 14. As is shown in FIGS. 1b and 1c, the multiple joint 16 consists for this purpose essentially of three pivot points 60, 62, 64 with axes 60', 62', 64', which are perpendicular to one another, and a telescopic linear part 66 connected to the last pivot point 64, the telescopic axis 66' of which part 66 is aligned with the pivot axis 64'. The brush head 18 is coupled through a further pivot point 68 with the orientation axis 68', with the orientation axis 68' being perpendicular to the telescopic axis 66', to the multiple joint 16. In this manner, an axis shift results between the axis 60' of the pivot point 60 and the axes 64' and 66' of the pivot point 64 and of the linear part 66, which axis shift results in a short design and enables by rotation about the axis 60' an additional compensation of the bend of the last arm 14 in direction of the axis of symmetry 19. Such a compensation is of importance since during programming of the washing paths, the symmetry characteristics of the airplane and of the large robot can be utilized.

The pivot-bearing block 11 has a console 34 on its side for receiving an opto-electronic distance camera 40, with the console 34 lying opposite the articulated mast in the collapsed state. The distance camera 40 is arranged on the console 34 at a sufficient height above the undercarriage 10 in order to be able to measure from the viewing window 42 significant points of the object of measurement 44. The distance camera is a 3D-laser scanner which scans a three-dimensional space within the viewing window 42 and digitizes same with respect to the distance from an object of measurement 44. The distance camera 40 works using a laser beam with a specific cycle frequency through the opening angle of the viewing window 42. The evaluation of the distance signals, which result from a time-difference measurement of reflected laser beams shows whether and at what distance a reflecting surface exists.

In order to move the large manipulator into a washing position in front of the aircraft 44, the manipulator must be specifically located during the start-up operation, so that all surface areas to be covered during a washing program lie within the reach and pivoting range of the articulated mast 13 with the washing brush 18. The digitized image data produced through the distance camera 40 is evaluated by an evaluating circuit and an on-board calculator for example a computer. A storage medium of the on-board calculator stores sections of an aircraft 44 that are significant for each aircraft type to be treated with reference to the viewing window 42 of the distance camera 40 as reference images. As a start-up aid, the distance camera continuously produces a distance image of the respective aircraft section and the on-board calculator compares it with the stored reference image. Direction and position data can be derived therefrom in the on-board calculator, which data informs the driver of the positioning direction and the distance. It is the goal of the start-up aid to position the large manipulator in a specified parking field within the reach of the aircraft 44. After reaching the parking field, the undercarriage 10 is supported on the ground by swinging out and lowering the support legs 50, and is thusly positioned relative to the aircraft.

The modified exemplary embodiment illustrated in FIGS. 3a and b has additionally a lifting and pivoting mechanism on the undercarriage 10, which has a center turning plate 36 and two driving wheels 38 concentrically alignable with respect to said turning plate 36 and angularly spaced from one another. It is possible with this mechanism to lift the undercarriage 10 from the ground by lowering the turning plate 36 and the driving wheels 38, and to pivot said undercarriage about the vertical axis defined by the turning plate with the help of the driving gears into the desired angular position in the direction of the double arrow 39 with reference to the aircraft 44.

The large manipulator can then be located relative to the aircraft 44. This is also accomplished with the help of the distance camera 40 through a comparison with a stored reference sample. After the locating has been done, the physical measurement values of the inclination indicator are detected by the distance camera 40 and are placed to zero through an initialization program. The relative angle is then taken into consideration during a movement of the articulated mast 13 based on the inclination of the base in the movement program.

When these preparations have been made and the washing program belonging with the located base has been selected, the actual washing operation can start. The articulated mast 13 is unfolded for this purpose. By successively calling up the joint coordinates from a data file, desired values are obtained, which are controlled by the washing brush, whereby the actual and desired-value comparison occurs at each individual joint through associated coordinate indicators. Fine compensations must be carried out because of deformations of the aircraft and of the substructure, inexactnesses in the process, and dynamic errors of the device. This can be achieved with an additional sensory mechanism, which compensates for the mentioned errors by measuring the bearing pressure and by supplying it to the auxiliary axes of the multiple joint 16. The auxiliary axes are designed as a telescopic axis and a pivot axis, thereby compensating for position errors and the orientation errors of the brush head 18.

Since the distance camera 40, in the chosen overhead operation, is always aligned in an operating direction, it can move with the articulated arm during the course of the washing program and can be utilized to monitor for collisions. The distance camera 40 can hereby measure individual joints, the aircraft 44, or other objects in he operating area and communicate the measured distances to a controller for controlling the articulated arm with respect to these, thereby preventing collisions. This type of operation could be important when, for example, a measured-value receiver breaks down at one of the joints and delivers incorrect measured values, which are not recognized by the operator or by the calculator.

In conclusion the following is to be stated: The invention relates to an arrangement for the surface cleaning of aircrafts with a large manipulator having an articulated mast consisting of several arms 12, 12', 12", 14 pivotal with respect to one another on pivot joints 20, 22, 24, 28 by means of hydraulic driving mechanisms 30, and is rotatably supported with its base arm 12 about a vertical axis 11' on a pivot-bearing block 11 of a motor-driven undercarriage 10, and has a rotating brush head 18 arranged at the free end of a multiple joint 16 arranged on the last arm 14. In order to enable a start-up aid for the undercarriage 10, a measuring of the location of the large manipulator relative to the aircraft, and/or a monitoring of the washing operation, an opto-electronic distance camera 40 alignable with respect to the aircraft 44 to be treated, and calculator-supported evaluating electronics loadable with the output signals of the distance camera 40 are provided on the pivot-bearing block 11 of the articulated mast.

We claim:

1. An arrangement for the surface treatment of large objects, comprising a large manipulator having an articulated mast, the articulated mast consisting of several arms which are pivotally connected to one another on pivot joints, driving means for pivoting adjacent ones of said several arms at said pivot joints, one of said several arms being a base arm rotatably supported about a vertical axis on a pivot-bearing block of an apparatus carrier, and said mast having a tool arranged on one of a last arm of the several arms and a multiple joint having a free end arranged on the last arm, the articulated mast having a collapsed state supported on the apparatus carrier having the base arm being supported under the other arms on the apparatus carrier, and the last arm being arranged with the multiple joint extending in a direction toward the pivot-bearing block and the tool being adjacent the other arms, wherein the improvement comprises an opto-electronic distance camera being aligned with respect to the large object to be treated, being arranged on a console mounted on a side of the articulated mast in the collapsed state supported on the apparatus carrier, and being rotatable about the vertical axis together with the articulated mast, and calculator-supported evaluating electronics receiving output signals from the distance camera for performing at least one of locating the large manipulator relative to the large object to be treated and monitoring the treatment operation.

2. The arrangement according to claim 1, wherein said tool is a rotating brush head.

3. The arrangement according to claim 1, wherein the distance camera is arranged on the large manipulator near the pivot-bearing block by a positioning means for selectively rigidly securing the distance camera to the console, for pivoting the distance camera about a vertical axis, and for inclining the distance camera about a horizontal axis.

4. The arrangement according to claim 1, wherein the base arm is supported pivotally having a pivot angle of approximately 180° about a horizontal axis on the pivot-bearing block.

5. The arrangement according to claim 1, wherein the base arm has a concave curvature opening upwardly remote from the apparatus carrier for receiving a second arm of the several arms hinged to the base arm in the collapsed state.

6. The arrangement according to claim 5, wherein the pivot joints provided at both ends of the second arm lie lower than a base pivot joint connecting the base arm to the pivot-bearing block when the articulated mast is in the collapsed state.

7. The arrangement according to claim 1, wherein the base arm and a second arm of the several arms attached at one end of the base arm both extend bend-free.

8. The arrangement according to claim 7, wherein the last arm is laterally bent with respect to a third arm of the several arms, and wherein the tool is supported near the pivot joint of the base arm on the pivot-bearing block when the articulated mast is in the collapsed state.

9. The arrangement according to claim 8, wherein said second and third arms are pivotally connected at one pivot joint to each other.

10. The arrangement according to claim 8, wherein the third arm is laterally bent with respect to the second arm toward the side opposite the last arm.

11. The arrangement according to claim 1, wherein the multiple joint has three pivot points driven by a motor, said three pivot points defining three axes arranged orthogonal to each other, and has a telescopible linear part connected to a last pivot point of the three pivot points, the telescopible linear part being aligned with the pivot axis of the last pivot point, being drivable by a motor, and being aligned in the collapsed state of the articulated mast parallel with respect to the last arm, wherein the tool is coupled through a further pivot point having an orientation axis perpendicular with respect to the telescopic axis of the telescopible linear part to the multiple joint, and the axes of the pivot point on the side of the last arm and of the linear part are arranged in planes, which are laterally offset with respect to one another and are parallel to one another.

12. The arrangement according to claim 1, wherein the driving means for the base arm is a hydraulic cylinder, and wherein the base arm and the driving means for the base arm are coupled with the pivot-bearing block through a Watt's link chain.

13. The arrangement according to claim 12, wherein the Watt's link chain has a coupling plate hinged above the pivot joint to the base arm and to a piston rod of the hydraulic cylinder, and a connecting rod hinged to the pivot-bearing block and to the coupling plate, and is curved oppositely relative to the base arm, ends of the connecting rod being positioned below the pivot joint.

14. The arrangement according to claim 1, wherein the maximum pivot angle between the base arm and a second arm of the several arms is approximately 180° and between the second arm and a third arm of the several arms is approximately 270°.

15. The arrangement according to claim 14, wherein the maximum pivot angle between the third arm and the last arm is in a range of 180° to 270°.

16. The arrangement according claim 1, wherein the apparatus carrier has a combined lifting and pivoting mechanism including a center turning plate and two driving wheels concentrically alignable with respect to the turning plate and arranged at an angular distance from one another, the driving wheels are lowerable into contact with the ground for lifting the undercarriage.

* * * * *